Patented Feb. 18, 1941

2,232,067

UNITED STATES PATENT OFFICE 2,232,067

DYESTUFFS OF THE NAPHTHOPHENO-SAFRANINE SERIES

Carl Höfchen and Eugen Huber, Leverkusen I. G.-Werk, Germany, assignors to General Aniline & Film Corporation, a corporation of Delaware No Drawing. Application June 1, 1938, Serial No. 211,216. In Germany June 4, 1937

18 Claims. (Cl. 8—72)

The present invention relates to new dyestuffs of the naphthophenosafranine series, to methods of preparing these dyestuffs, to the application of the said dyestuffs in the chromium printing process, and to dyed fibers.

Up to the present time chrome dyestuffs of the naphthophenosafranine series have been comparatively unknown. In German Patent No. 97,365 (Example 3) a dyestuff is mentioned which is obtained by an oxidising condensation of p-aminosalicylic acid with neutral blue. The dyestuff is said to be difficulty soluble and is said to dye wool reddish-violet, chromed wool dark blue.

In German Patent No. 97,396 (Example 4) a dyestuff is described which is obtained by an oxidising condensation of aminosalicylic acid with the isorosinduline sulfonic acid obtained from $\beta_1\alpha_4$-p-tolylnaphthylamino sulfonic acid and nitrosodimethylaniline. According to this specification the dyestuff dyes wool in an acid bath violet, chromed wool blue shades.

Further in German specification No. 183,117 a dyestuff is described which is obtained by treating phenylisorosinduline chloride with oleum and by an oxidising condensation of p-aminosalicylic acid with the disulfonic acid obtained. The dyestuff contains 2 sulfonic acid groups which, according to present knowledge, are present in the phenyl nucleus attached to the position 3. The oxidising condensation as described in this patent takes place only with difficulty. According to this specification the dyestuff dyes wool in an acid bath bluish violet shades.

In German Patent No. 87,671 a dyestuff from ditolyl-$\alpha_1\beta_2$-naphthylenediamine-$\alpha_3$-sulfonic acid and benzene azosalicylic acid is described. According to this specification the dyestuff obtained dyes chromed wool bluish-red. On sulfonating the dyestuff a more easily soluble product is obtained which is said to yield on wool red and on chromed wool beautiful bluish-red shades.

So far as the field of the chrome dyestuffs is concerned no practical results could be attained with the above processes. Regarding the possibility of using dyestuffs of the above mentioned character for the chromium printing process nothing was known hitherto.

According to the present invention dyestuffs of the naphthophenosafranine series can be employed with success for the chromium printing process. All those dyestuffs of the naphthophenosafranine series come into question which contain at least one hydroxy-carboxylic acid grouping and which further possess due to the presence of solubilizing groups, a solubility sufficient for use in the chromium printing process. The present invention thus concerns using dyestuffs of this kind for the chromium printing process.

The term "hydroxycarboxylic acid grouping" comprises any groupings of a hydroxy and a carboxylic acid group, which are capable of forming chromium compounds. Preferably salicylic acid groupings and o-hydroxynaphthoic acid groupings and the substitution products thereof are concerned.

When used in the chromium printing process the dyestuffs show a good fixability on the materials in question, a good fastness to washing, a good resistance to discharging agents and clear shades of the prints.

Especially distinguished by an excellent resistance to discharging agents are those dyestuffs which are substituted in the nucleus I by halogen (cf. the following formula).

As printing processes suitable for the present invention may be mentioned, for instance: machine printing, film printing, hand printing, spray printing, relief printing. The printing process wth the specified dyestuffs can be employed especially on cotton, regenerated cellulose, cellulose esters, linen, wool, silk and mixed fabrics of these textile fibres.

The present invention further relates to new dyestuffs of the naphthophenosafranine series which can be used with good result also for other purposes than for the chromium printing process. The dyestuffs which here come into question are those of the following general formula:

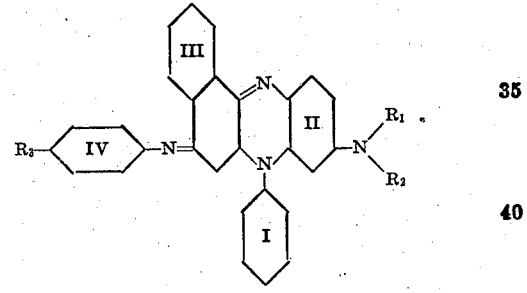

in which one hydroxycarboxylic acid grouping must be present in one of the nuclei I, III or IV or in one of the substituents $R_1$, $R_2$ or $R_3$, and further hydroxycarboxylic acid groupings can be present in any position of the dyestuff, and wherein at least one sulfonic acid group must be present in one of the nuclei I, II, III or IV, and at least a second sulfonic acid group must further be present in the dyestuff. $R_1$ and $R_2$ stand for any radicals, as for instance hydrogen, alkyl, aralkyl, hydroaryl, aryl and the substitution products thereof; $R_3$ may also represent any radical, in particular free or substituted hydroxy and amino groups. The nucleus I is shown in the above formula as a phenyl nucleus, however it can also stand for a naphthyl nucleus or any other aromatic, hydro-aromatic or aliphatic radical. Moreover, the nuclei I, II, III and IV can contain further substituents.

These dyestuffs may be obtained in such a manner that for instance dianilido-ε-acid or the derivatives thereof (dianisyl-ε-acid, ditolyl-ε-acid), diarylido-T-acids are condensed by oxidation according to known methods (as for instance oxidizing condensation of the components in weakly alkaline solution by air in the presence of an ammoniacal copper solution) with such derivatives of 4-aminodiphenylamine or its sulfonic acids which contain a hydroxycarboxylic acid grouping. It is also possible to start from isorosinduline-6-sulfonic acids, which either may contain already a suitable hydroxy carboxylic acid grouping in the nuclei I or III, and react the same with any aromatic amine, diamine or their sulfonic acids, or the 6-sulfonic acid group may be replaced by an aromatic amino-hydroxy-carboxylic acid notwithstanding the fact whether or not the nuclei I or III contain already a hydroxy-carboxylic acid grouping. The hydroxy-carboxylic acid groupings introduced by this replacement reaction may stand not only directly in the nucleus IV but also in the substituent R3 and here either as amino-hydroxy-carboxylic acids or as amide of a hydroxy-carboxylic acid. In case the number of sulfonic acid groups introduced by the synthesis does not warrant a sufficient solubility of the dyestuff, further sulfonic acid groups may be introduced by treating the dyestuff with sulfonating agents.

The new dyestuffs are dark crystalline water-soluble powders which dissolve in concentrated sulfuric acid with green coloration.

Dyestuffs of the above formula also yield good results in other fields than in the chromium printing process in comparison with known dyestuffs of a similar constitution. They yield for instance in dyeing chromed wool or in dyeing unchromed wool when applying chromium compounds or in dyeing suitable fibres, as for instance wool in an acid bath, clear shades of good fastness properties.

The following examples illustrate but do not limit the invention:

Example 1

1/20 mol of dianilido-ε-acid and 1/20 mol of 5'-sulfo-4'-hydroxy-3'-carboxy-4-aminodiphenylamine-2-sulfonic acid are dissolved with 200 ccs. of water and the necessary quantity of sodium carbonate to a weakly alkaline solution, and, after the addition of 200 ccs. of alcohol and 10 ccs. of an ammoniacal copper solution are condensed by oxidation with air.

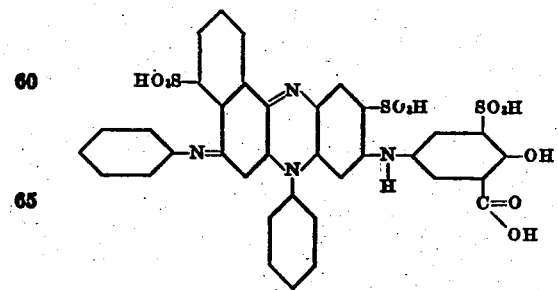

The separated dyestuff dissolves in water with a reddish blue and in sulfuric acid with a green coloration.

Chromium printing 20 g. of the dyestuff are dissolved in 280 g. of water or in a mixture of water and a solvent, such as glycerine, urea, thiodiglycol or others, the solution is stirred into 550 g. of acetic acid starch-tragacanth thickener; thereto 50 g. of acetic acid (30%) and 100 g. of chromium acetate (20° Bé.) are added. The paste is printed on cotton in the usual manner; after drying the material is steamed for about one hour and then washed. In this manner vivid reddish blue shades are obtained. The dyestuff also fixes well on naphtholized materials; it exhibits good fastness to washing and is very resistant to discharging agents.

Example 2

Similar in manufacture and dyeing qualities is the dyestuff which is obtained by an oxidizing condensation of dianilido-ε-acid with 5'-sulfo-3'-carboxy-2'-hydroxy-4-amino-diphenylamine-2-sulfonic acid.

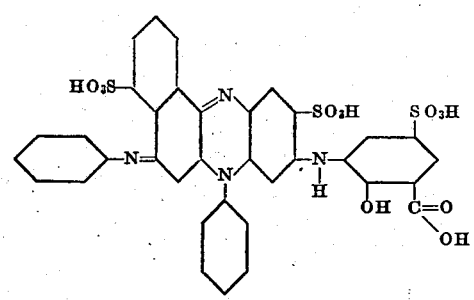

It yields, when printed with chromium mordant, blue shades of good fastness to washing and is of a good resistance to discharging agents.

Example 3

By heating of 3-diethylisorosinduline-1.6-disulfonic acid with 5-sulfo-3-amino-2-hydroxybenzoic acid in the presence of sodium acetate in an aqueous or dilute alcoholic solution, a dyestuff is obtained which dissolves in water with a blue, in sulfuric acid with a green coloration.

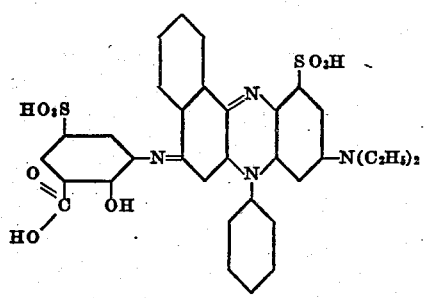

When printed with chromium mordant the dyestuff yields clear greenish-blue shades of good fastness to light and washing and good resistance to discharging agents.

When dyed on wool from an acid bath clear bluish-violet shades are obtained; by aftertreatment with chromium yielding agents or by dyeing on chromed wool clear blue shades of good fastness properties are obtained.

Example 4

By reacting 11-methyl-3-diethylisorosinduline-1.6-disulfonic acid with 5'-sulfo-4'-hydroxy-3'-carboxy-4-amino-diphenylamine-2-sulfonic acid at water bath temperature in the presence of sodium acetate in an aqueous or dilute alcoholic solution a dyestuff is obtained which dissolves in water with a clear blue coloration, in concentrated sulfuric acid with a green coloration. It dyes wool clear greenish-blue shades of good fastness to light and washing, chromed wool somewhat less clear, but likewise of good fastness properties.

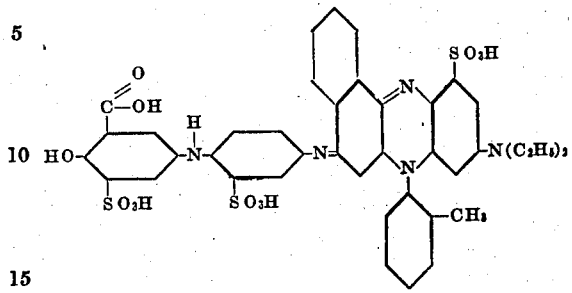

When printed with chromium mordant it yields clear blue shades of good fastness to washing and good resistance to discharging agents.

EXAMPLE 5

From 3-diethylisorosinduline-1.6.12-trisulfonic acid and 2' - hydroxy - 3' - carboxy - 4 - amino-diphenylamine-2-sulfonic acid, a dyestuff is obtained which dissolves in water with a greenish-blue, in concentrated sulfuric acid with a green coloration.

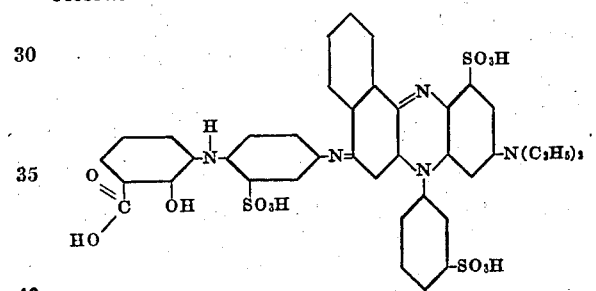

It dyes wool greenish-blue shades of good fastness properties.

When printed with chromium mordant on cotton, it yields a full blue of good fastness to washing and good resistance to discharging agents and it can also be fixed well on naphtholized material.

EXAMPLE 6

By heating of 11.13 - dichloro - 3 - diethyliso-rosinduline-1.6-disulfonic acid with 5-sulfo-3-amino-2-hydroxybenzoic acid in the presence of sodium acetate a dyestuff is formed of the constitution:

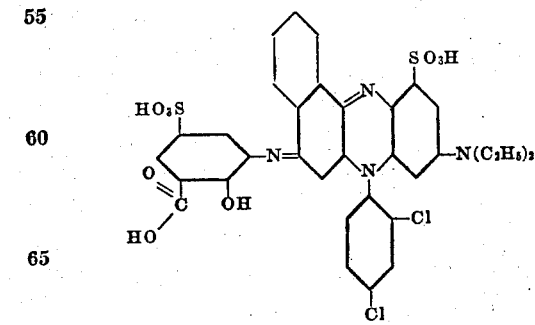

which dissolves in water with a clear greenish-blue, in concentrated sulfuric acid with a green coloration.

When printed with chromium mordant on cotton the dyestuff yields clear greenish-blue shades of very good resistance to discharging agents and very good fastness to washing.

EXAMPLE 7

If in the foregoing example instead of 5-sulfo-3 - amino - 2 - hydroxybenzoic acid 5' - sulfo-4' - hydroxy - 3' - carboxy - 4 - aminodiphenyl-amine-2-sulfonic acid is used a dyestuff of the same good properties is obtained. The dyestuff corresponds in its free state to the following formula:

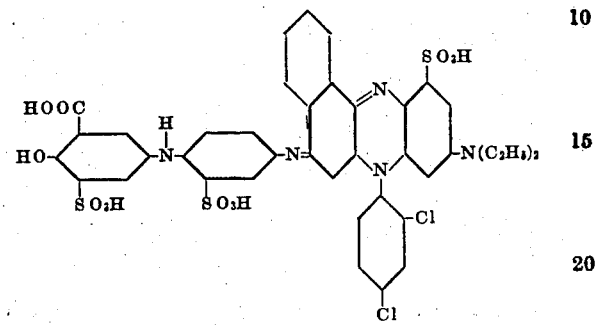

EXAMPLE 8

By heating of 11-methyl-13-hydroxy-14-car-boxy-3-diethyl-isorosinduline-1.6-disulfonic acid with 5-sulfo-3-amino-2-hydroxybenzoic acid in the presence of sodium acetate in an aqueous or a dilute alcoholic solution a dyestuff is obtained which dissolves in water with a blue, in sulfuric acid with a green coloration.

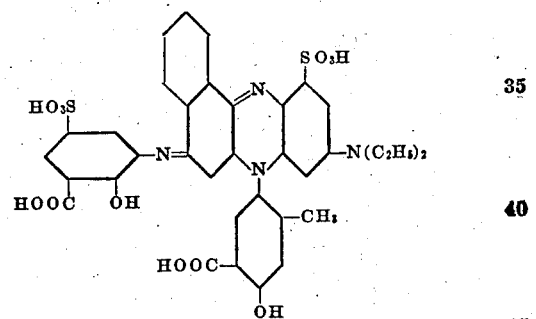

Printed with chromium mordant on cotton it yields clear blue shades of good fastness to washing and good resistance to discharging agents.

EXAMPLE 9

By reacting 8-carboxy-9-hydroxy-3-diethyl-isorosinduline-1.6-disulfonic acid with 5-sulfo-3-amino-2-hydroxybenzoic acid in the presence of sodium acetate at water bath temperature, a dyestuff is formed which dissolves in water with a violet, in concentrated sulfuric acid with a dull bluish-green coloration.

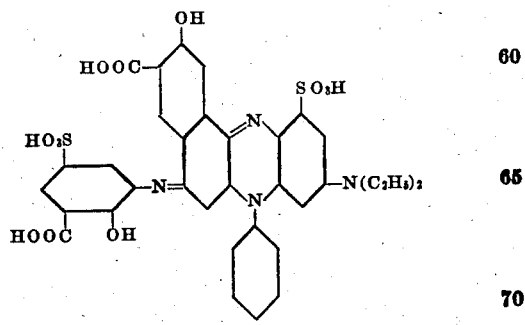

When printed with chromium mordant on cotton it yields a full violet of a good fastness to washing and good resistance to discharging agents.

Example 10

The dyestuff of the formula:

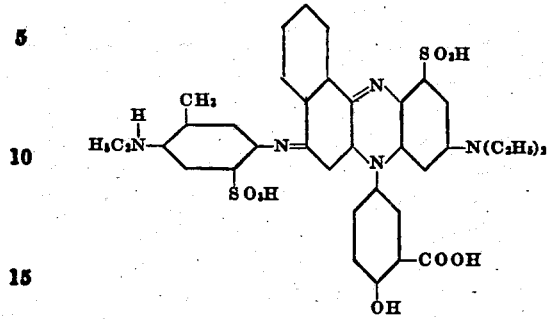

is obtained by heating the 12-carboxy-13-hydroxy-3-diethyl-isorosinduline-1.6-disulfonic acid with 5-amino-2-ethyl-toluidine and sulfonating the dyestuff thus obtained with five times the quantity of 20% oleum at about 70° C. The dyestuff dyes wool from an acid bath in greenish-blue shades of good fastness properties.

When printed with chromium mordant on cotton, reddish-blue shades likewise of good fastness properties are obtained.

Example 11

By heating 11.15-dimethyl-3-diethyl-isorosinduline-6-monosulfonic acid with 5-sulfo-3-amino-2-hydroxybenzoic acid a difficultly soluble dyestuff is obtained which is sulfonated by several hours' stirring with five times the quantity of 30% oleum.

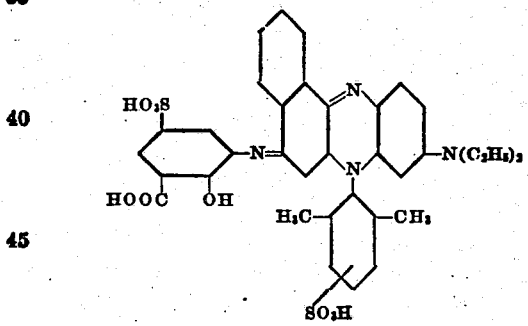

When printed with chromium mordant on cotton a clear greenish blue, which also fixes well on naphtholized material, of good fastness to washing and good resistance to discharging agents is obtained.

Example 12

By reacting 11.13-dichloro-3-sulfoethylbutyl-isorosinduline-6-sulfonic acid with 5-sulfo-3-amino-2-hydroxybenzoic acid at water bath temperature in the presence of sodium acetate a dyestuff of the following formula is obtained:

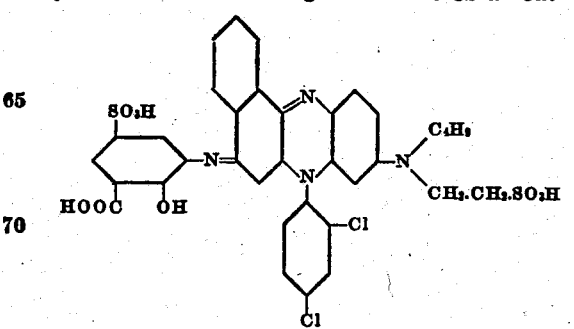

It dissolves in water with bluish-violet coloration, in concentrate sulfuric acid with green coloration. When printed with chromium mordant on cotton it yields a very bright blue of good fastness to washing and good resistance to discharging agents.

Example 13

By reacting 3-sulfobenzylethyl-isorosinduline-6-sulfonic acid with 5'-sulfo-4'-hydroxy-3'-carboxy-4-aminodiphenylamine-2-sulfonic acid at water bath temperature in the presence of sodium acetate a dyestuff of the following formula is obtained:

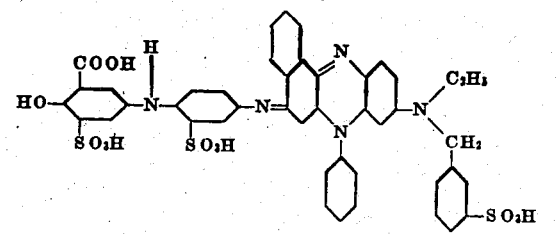

It dissolves in water with a reddish-blue, in concentrated sulfuric acid with green coloration. When printed with chromium mordant on cotton it yields reddish blue shades of good fastness to washing and good resistance to discharging agents.

Example 14

By heating 3-methylcyclohexylisorosinduline-6.9-disulfonic acid with 5'-sulfo-4'-hydroxy-3'-carboxy-4-aminodiphenylamine-2-sulfonic acid in the presence of sodium acetate a dyestuff of the following formula is obtained:

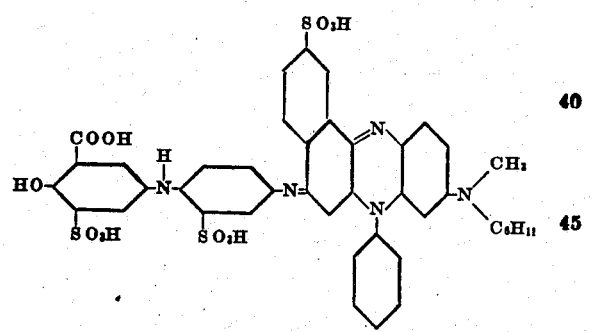

In its dyeing properties it resembles the foregoing dyestuff.

Example 15

The isorosinduline of vic.-m-xylyl-β-naphthylamine and nitrosodiethylaniline is condensed with p-aminosalicylic acid to the corresponding safranine by oxidation with air; the safranine thus obtained is transformed into the disulfonic acid by heating it for some hours with five times its quantity of a 32% oleum at a temperature of about 30° C.:

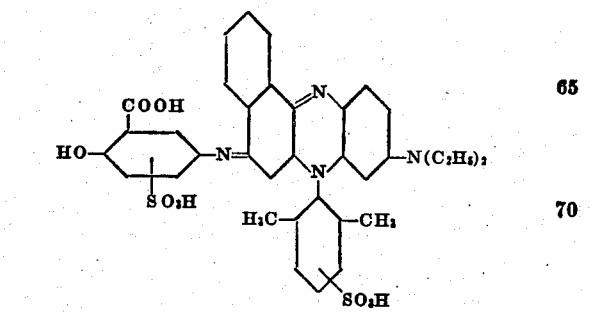

The dyestuff dissolves in concentrated sulfuric acid with green and in water with bluish-violet coloration. Dyed on wool from an acid bath it yields a clear, rich, reddish blue of good fastness properties. By after-treatment with chromium yielding agents the dyeings become bluer of otherwise good fastness properties.

With chromium mordant printed on cotton bright blue shades of good fastness to washing and good resistance to discharging agents are obtained.

EXAMPLE 16

By heating 3-diethylisorosinduline-1.6-disulfonic acid with 4'-aminogallanilide in dilute alcohol in the presence of sodium acetate at first an insoluble 1-monosulfonic acid of the corresponding naphthophenosafranine is obtained, which is converted into a soluble disulfonic acid by sulfonating with 5 parts of a 32% oleum and short heating to 50° C.

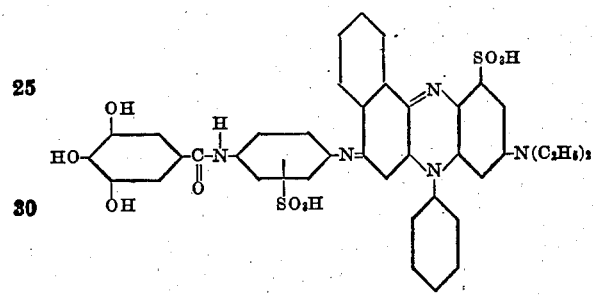

The sodium salt of the dyestuff dissolves in water with clear greenish-blue, in concentrate sulfonic acid with green coloration.

With chromium mordant printed on cotton the dyestuff yields clear greenish blue shades of very good fastness to washing and very good resistance to discharging agents.

EXAMPLE 17

By heating 1-chloro-3-diethylisorosinduline-6.9-disulfonic acid with 5-sulfo-3-amino-2-hydroxybenzoic acid in the presence of sodium acetate a dyestuff is obtained, which dissolves in water with clear reddish blue and in concentrated sulfuric acid with green coloration:

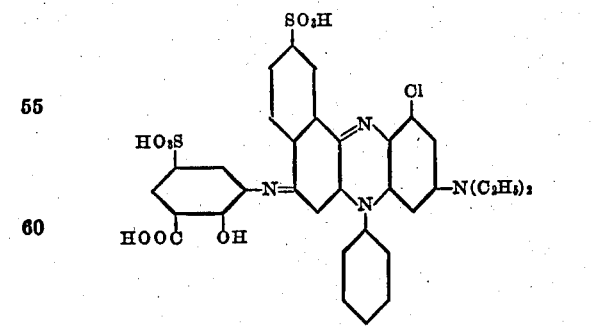

With chromium mordant printed on cotton the dyestuff yields clear blue shades of good fastness to washing and good resistance to discharging agents.

EXAMPLE 18

By reacting the corresponding hexahydro-3-diethylisorosinduline-1.6-disulfonic acid with 5'-sulfo-4'-hydroxy-3'-carboxy-4-aminodiphenylamine-2-sulfonic acid in the presence of sodium acetate while heating to 80-90° C. a dyestuff of the following formula is obtained:

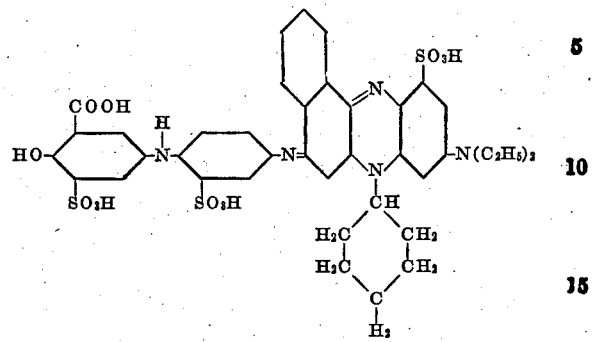

The dyestuff obtained dissolves in water with clear blue and in concentrated sulfuric acid with green coloration. With chromium mordant printed on cotton the dyestuff yields clear blue shades of good fastness to washing and good resistance to discharging agents.

EXAMPLE 19

In analogous manner as described in the foregoing example, a dyestuff of the formula:

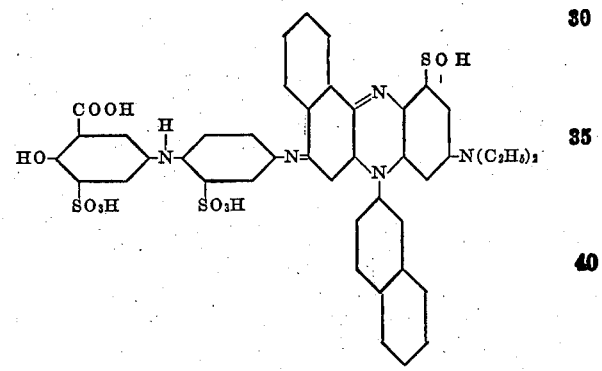

is obtained from the corresponding isorosinduline-1.6-disulfonic acid. It dissolves in water with greenish blue, in concentrated sulfuric acid with green coloration and yields, when printed on cotton with chromium mordant, rich greenish blue shades of good fastness to washing and good resistance to discharging agents.

EXAMPLE 20

Similar in preparation and properties is the dyestuff of the following formula:

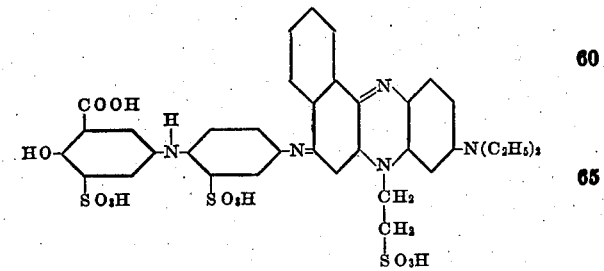

EXAMPLE 21

In analogous manner as described in the foregoing example by heating the corresponding 1.6-disulfonic acid with 5'-sulfo-4'-hydroxy-3'-carboxy-4-aminodiphenylamine-2-sulfonic acid in the presence of sodium acetate a dyestuff of the following constitution is obtained:

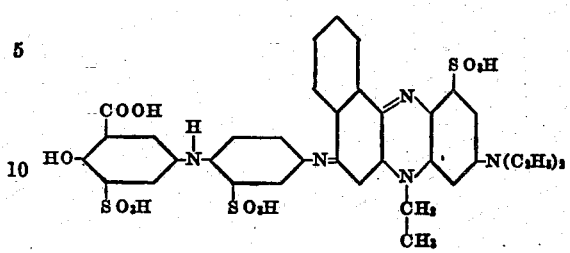

The dyestuff dissolves in water with clear blue, in concentrate sulfuric acid with green coloration; printed on cotton with chromium mordant it yields rich clear blue shades of very good fastness to washing and very good resistance to discharging agents.

EXAMPLE 22

The dyestuff of the formula:

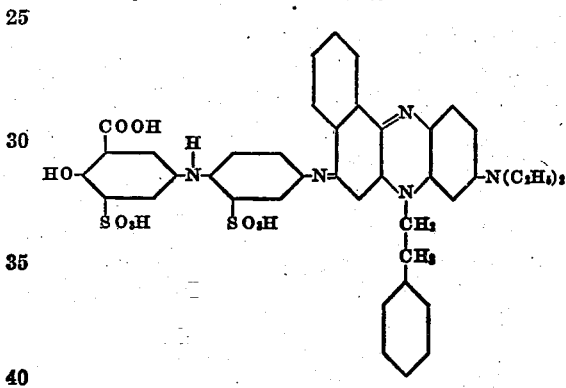

is obtained in analogous manner as the foregoing ones. It is of somewhat redder shade than these, but otherwise of the same properties.

We claim:

1. As new products the dyestuffs corresponding in the free state to the general formula:

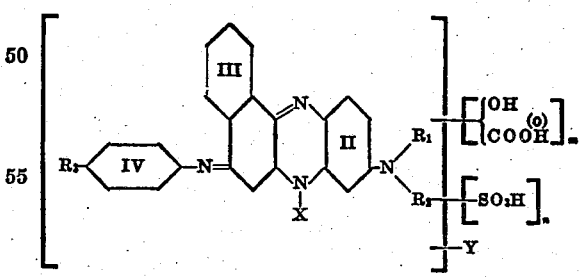

wherein $R_1$ and $R_2$ stand for a member of the group consisting of hydrogen, alkyl, aryl, aralkyl and hydroaryl, $R_3$ stands for a member of the group consisting of hydrogen, hydroxyl, alkylamino-, arylamino- and aroylamino-radicals, X stands for a member of the group consisting of alkyl, aryl, aralkyl and hydroaryl, Y stands for a member of the group consisting of hydrogen, alkyl, halogen and hydroxyl, $m$ and $n$ stand for whole numbers, $n$ being at least 2, and wherein one o-hydroxycarboxylic acid grouping is attached to one of the group consisting of X, III, IV, $R_1$, $R_2$ and $R_3$ and at least one $SO_3H$-group is attached to one of the group consisting of X, II, III and IV.

2. As new products the dyestuffs corresponding in the free state to the general formula:

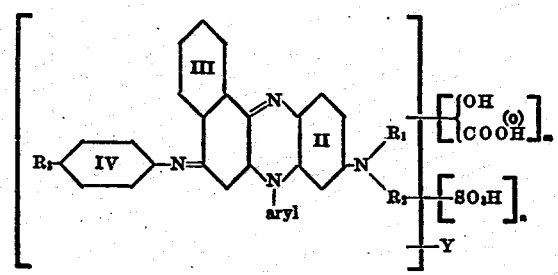

wherein $R_1$ and $R_2$ stand for a member of the group consisting of hydrogen, alkyl, aryl, aralkyl and hydroaryl, $R_3$ stands for a member of the group consisting of hydrogen, hydroxyl, alkylamino-, arylamino- and aroylamino-radicals, Y stands for a member of the group consisting of hydrogen, alkyl, halogen and hydroxyl, $m$ and $n$ stand for whole numbers, $n$ being at least 2, and wherein one o-hydroxycarboxylic acid grouping is attached to one of the group consisting of "aryl," III, IV, $R_1$, and $R_2$ and $R_3$ and at least one $SO_3H$-group is attached to one of the group consisting of "aryl," II, III and IV.

3. As new products the dyestuffs corresponding in the free state to the general formula:

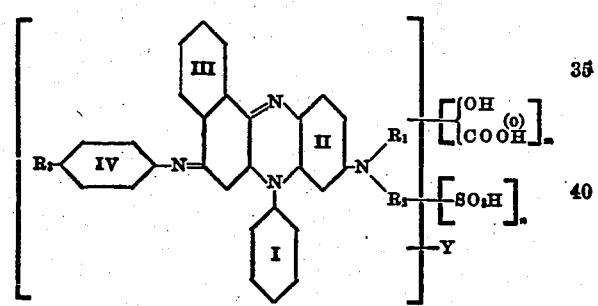

wherein $R_1$ and $R_2$ stand for a member of the group consisting of hydrogen, alkyl, aryl, aralkyl and hydroaryl, $R_3$ stands for a member of the group consisting of hydrogen, hydroxyl, alkylamino-, arylamino- and aroylamino-radicals, Y stands for a member of the group consisting of hydrogen, alkyl, halogen and hydroxyl, $m$ and $n$ stand for whole numbers, $n$ being at least 2, and wherein one o-hydroxycarboxylic acid grouping is attached to one of the group consisting of I, III, IV, $R_1$, $R_2$ and $R_3$ and at least one $SO_3H$-group is attached to one of the group consisting of I, II, III and IV.

4. As new product the dyestuff corresponding in its free state to the formula:

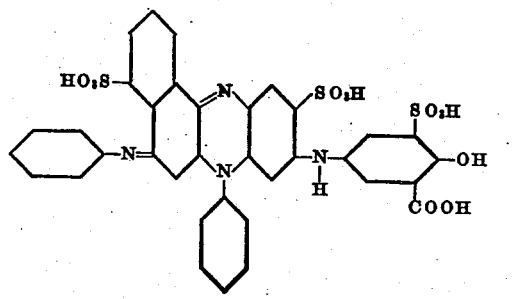

5. As new product the dyestuff corresponding in its free state to the formula:

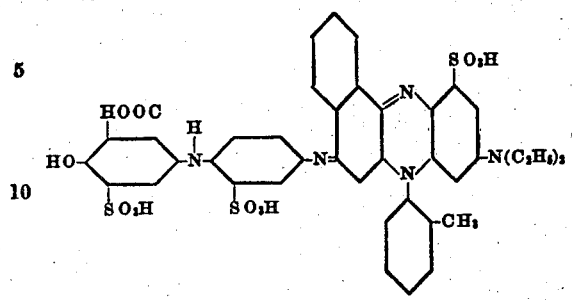

6. As new product the dyestuff corresponding in its free state to the formula:

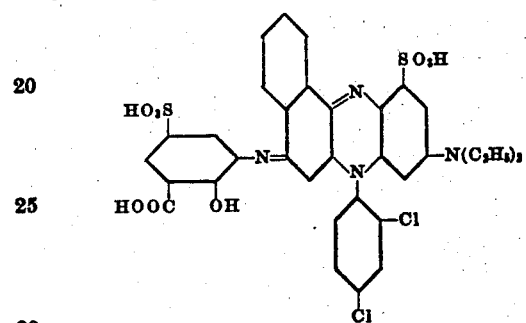

7. Process for the production of dyeings according to the chromium printing process which comprises printing on fibers with a chromium printing paste which contains as essential ingredient a dyestuff as claimed in claim 1.

8. Process for the production of dyeings according to the chromium printing process which comprises printing on fibers with a chromium printing paste which contains as essential ingredient a dyestuff as claimed in claim 2.

9. Process for the production of dyeings according to the chromium printing process which comprises printing on fibers with a chromium printing paste which contains as essential ingredient a dyestuff as claimed in claim 3.

10. Process for the production of dyeings according to the chromium printing process which comprises printing on fibers with a chromium printing paste which contains as essential ingredient a dyestuff as claimed in claim 4.

11. Process for the production of dyeings according to the chromium printing process which comprises printing on fibers with a chromium printing paste which contains as essential ingredient a dyestuff as claimed in claim 5.

12. Process for the production of dyeings according to the chromium printing process which comprises printing on fibers with a chromium printing paste which contains as essential ingredient a dyestuff as claimed in claim 6.

13. Fibers dyed with the chrome derivative of a dyestuff, as claimed in claim 1.

14. Fibers dyed with the chrome derivative of a dyestuff, as claimed in claim 2.

15. Fibers dyed with the chrome derivative of a dyestuff, as claimed in claim 3.

16. Fibers dyed with the chrome derivative of the dyestuff of claim 4.

17. Fibers dyed with the chrome derivative of the dyestuff of claim 5.

18. Fibers dyed with the chrome derivative of the dyestuff of claim 6.

CARL HÖFCHEN.
EUGEN HUBER.